United States Patent
Silverstein et al.

(10) Patent No.: US 9,374,526 B2
(45) Date of Patent: Jun. 21, 2016

(54) PROVIDING FRAME DELAY USING A TEMPORAL FILTER

(71) Applicant: Apple Inc., Cupertino, CA (US)

(72) Inventors: D. Amnon Silverstein, Palo Alto, CA (US); Suk Hwan Lim, Mountain View, CA (US)

(73) Assignee: Apple Inc., Cupertino, CA (US)

(*) Notice: Subject to any disclaimer, the term of this patent is extended or adjusted under 35 U.S.C. 154(b) by 7 days.

(21) Appl. No.: 14/449,010

(22) Filed: Jul. 31, 2014

(65) Prior Publication Data

US 2016/0037058 A1 Feb. 4, 2016

(51) Int. Cl.
*H04N 5/232* (2006.01)
*G06T 5/10* (2006.01)

(52) U.S. Cl.
CPC .............. *H04N 5/23229* (2013.01); *G06T 5/10* (2013.01); *G06T 2207/20024* (2013.01); *G06T 2207/20182* (2013.01)

(58) Field of Classification Search
CPC ................. H04N 5/23229; G06T 5/10; G06T 2207/20024; G06T 2207/20182
USPC .......................................................... 348/241
See application file for complete search history.

(56) References Cited

U.S. PATENT DOCUMENTS

| | | | |
|---|---|---|---|
| 6,157,677 A | 12/2000 | Martens et al. | |
| 7,822,287 B2 | 10/2010 | Frank | |
| 7,881,387 B2 | 2/2011 | Han et al. | |
| 7,991,196 B2 | 8/2011 | Tener et al. | |
| 8,619,881 B2 | 12/2013 | Schoenblum | |
| 8,698,834 B2 | 4/2014 | Brown Elliott | |
| 2006/0045181 A1* | 3/2006 | Chen | H04N 19/117 375/240.12 |
| 2007/0014445 A1 | 1/2007 | Lin | |
| 2009/0273716 A1* | 11/2009 | Wu | H04N 19/117 348/607 |
| 2010/0045870 A1* | 2/2010 | Chao | H04N 5/21 348/607 |
| 2011/0090351 A1 | 4/2011 | Cote et al. | |

(Continued)

FOREIGN PATENT DOCUMENTS

| | | |
|---|---|---|
| WO | 2013049412 | 4/2013 |
| WO | 2014074601 | 5/2014 |

OTHER PUBLICATIONS

U.S. Appl. No. 14/449,011, filed Jul. 31, 2014, Suk Hwan Lim, et al.

(Continued)

*Primary Examiner* — Gevell Selby
(74) *Attorney, Agent, or Firm* — Robert C. Kowert; Meyertons, Hood, Kivlin, Kowert & Goetzel, P.c.

(57) ABSTRACT

A temporal filter in an image processing pipeline may insert a frame delay when filtering an image frame. A given pixel of a current image frame may be received and a filtered version of the given pixel may be generated, blending the given pixel and a corresponding pixel of a reference image frame to store as part of a filtered version of the current image frame. If a frame delay setting is enabled, the corresponding pixel of the reference image frame may be provided as output for subsequent image processing inserting a frame delay for the current image frame. During the frame delay programming instructions may be received and image processing pipeline components may be configured according to the programming instructions. If the frame delay setting is disabled, then the filtered version of the given pixel may be provided as output for subsequent image processing.

20 Claims, 6 Drawing Sheets

(56) References Cited

U.S. PATENT DOCUMENTS

| | | | |
|---|---|---|---|
| 2012/0106639 A1* | 5/2012 | Yang | G06T 5/002 375/240.16 |
| 2013/0038745 A1 | 2/2013 | Myokan | |
| 2013/0070965 A1 | 3/2013 | Jang et al. | |
| 2013/0094569 A1 | 4/2013 | Chong et al. | |
| 2013/0266079 A1 | 10/2013 | Huang et al. | |
| 2014/0003528 A1 | 1/2014 | Tourapis | |
| 2014/0028876 A1* | 1/2014 | Mills | H04N 5/77 348/231.99 |
| 2014/0078347 A1 | 3/2014 | DeBattista | |

OTHER PUBLICATIONS

U.S. Appl. No. 14/449,015, filed Jul. 31, 2014, Suk Hwan Lim, et al.
U.S. Appl. No. 14/449,016, filed Jul. 31, 2014, Suk Hwan Lim, et al.

* cited by examiner

US 9,374,526 B2

PROVIDING FRAME DELAY USING A TEMPORAL FILTER

BACKGROUND

Image data captured by an image sensor is often initially processed as part of an image processing pipeline in order to prepare the captured image data for further processing or consumption. In this way, real-time corrections and/or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections and/or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera capable of capturing image data may, in some embodiments, be configured to perform temporal filtering on image data received from the camera's image sensor. A stream of pixels of a captured image frame may be processed at the temporal filter in order to reduce image noise. The temporal filter may implement a blending technique to generate a version of the captured image frame filtered based on a previously filtered image frame. The filtered version of the captured image frame may then be stored to filter the next image frame received at the temporal filter. The temporal filter may insert a frame delay for the captured image frame by providing the previously filtered image frame as the output of the temporal filter, instead of the current image frame. The filtered version of the current image frame may then be maintained and provided as the output of the temporal filter after being used to filter the next image frame in the image processing pipeline.

Figure 1:
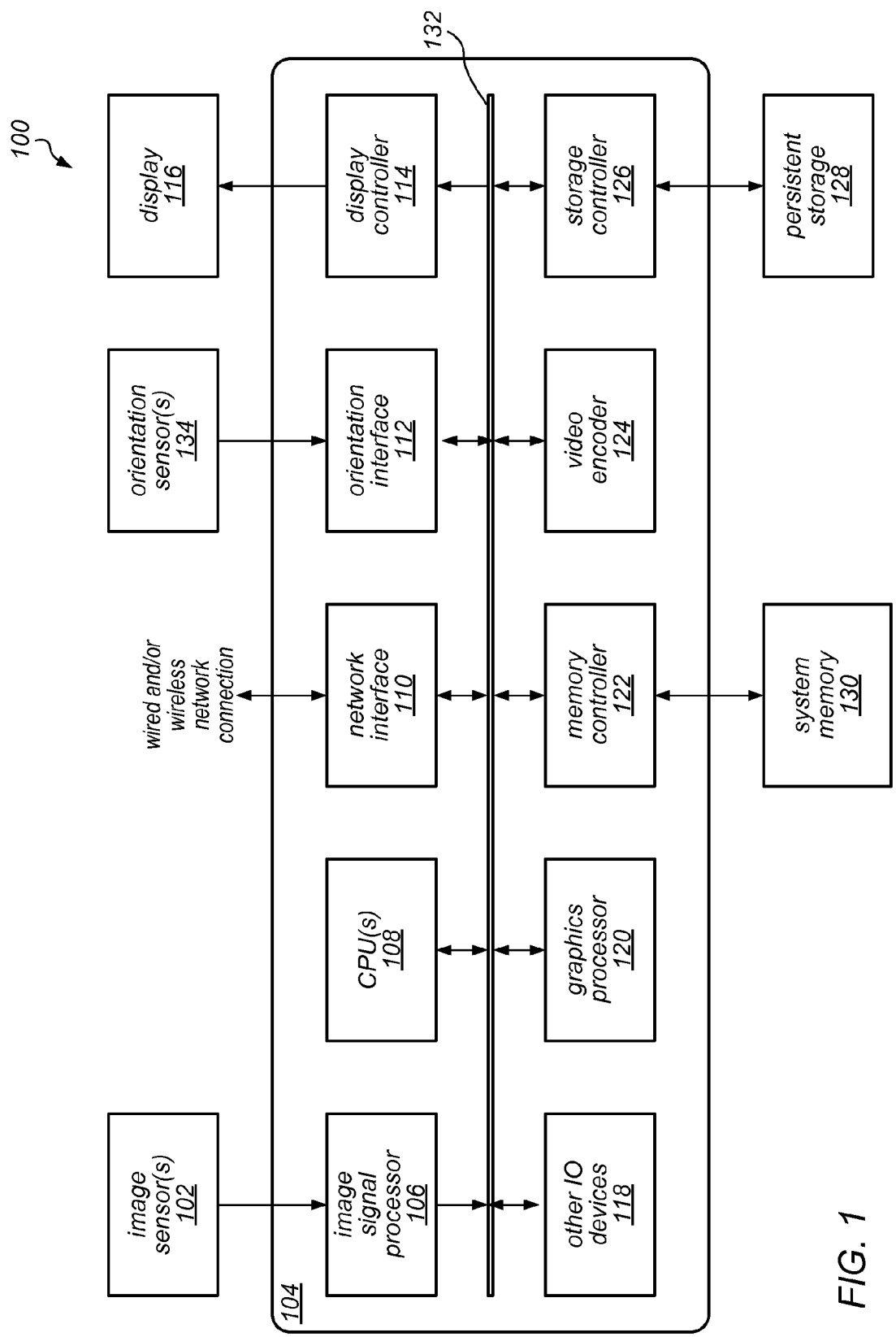
FIG. 1 is a logical block diagram illustrating an example system that may implement an image processing pipeline that performs temporal filtering using spatial filtering and noise history, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques and/or components to correct or enhance image data captured by an image sensor. In various embodiments, temporal filtering may perform noise filtering on image data. Temporal filtering is based on filtering the pixel values of a current image frame captured at an image sensor using pixel values of a previously filtered image frame. Pixel values from the previously filtered image frame, referred to herein as the reference image frame, may be combined with the pixel values of the current image frame to get a best estimate of the pixel values with reduced noise. Over time, as more image frames are filtered at the temporal filter, the reference image frame may provide a higher quality image with less noise.

As a filtered version of an image frame is maintained for filtering the next image frame in the image processing pipeline, the output of the temporal filter that would be provided to subsequent components in the image processing pipeline for further processing may be maintained for a length of time to filter the next image frame at a temporal filter. In various embodiments, the temporal filter may be configured to insert a frame delay for the image frame. In some embodiments, the frame delay may be equivalent to an amount of time for filtering the next image frame in the image processing pipeline. A frame delay setting or some other parameter may be implemented, in some embodiments, allowing the temporal filter to be programmatically changed to provide frame delays or not to provide frame delays for respective image frames.

Introduction of a frame delay may be advantageous for image processing pipeline components that process image data downstream from or subsequent to the temporal filter. For example, various different processing components may utilize some latency introduced by a frame delay to prepare to process an image frame. In one example, a subsequent pipeline processing component may be configured to perform video stabilization techniques, in various embodiments. The subsequent pipeline processing component may be informed by information provided from a source external to the image processing pipeline. Orientation information, for instance, from an orientation sensor may be used to determine how to configure the component performing the image stabilization. Ordinarily, such information may not be available when the image frame is at the component for processing, without some latency introduced into the image processing pipeline. The frame delay for the image frame may provide latency sufficient to allow the information to be obtained and the component programmed to perform image stabilization. Please note that a variety of different processes or components may utilize latency in the image processing pipeline and, thus, the previous example is not intended to be limiting.

The techniques described herein for introducing a frame delay using a temporal filter may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes an image sensor 102, a system-on-a chip (SOC) component 104, system memory (e.g., DRAM) 130, persistent storage (e.g., flash memory) 128, and a display 116 (e.g., LCD). In this example, image sensor 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images and/or video clips. Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 (e.g., gyroscope) from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 and/or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data and/or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, and/or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, and/or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In some embodiments program instructions stored in system memory 130 may be executed by CPU 108 and/or GPU 120 to provide various functions of system 100.

In other embodiments, various functions may be performed by software components executing in memory on another device and communicating with the illustrated system via inter-computer communication. Some or all of these software components and/or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
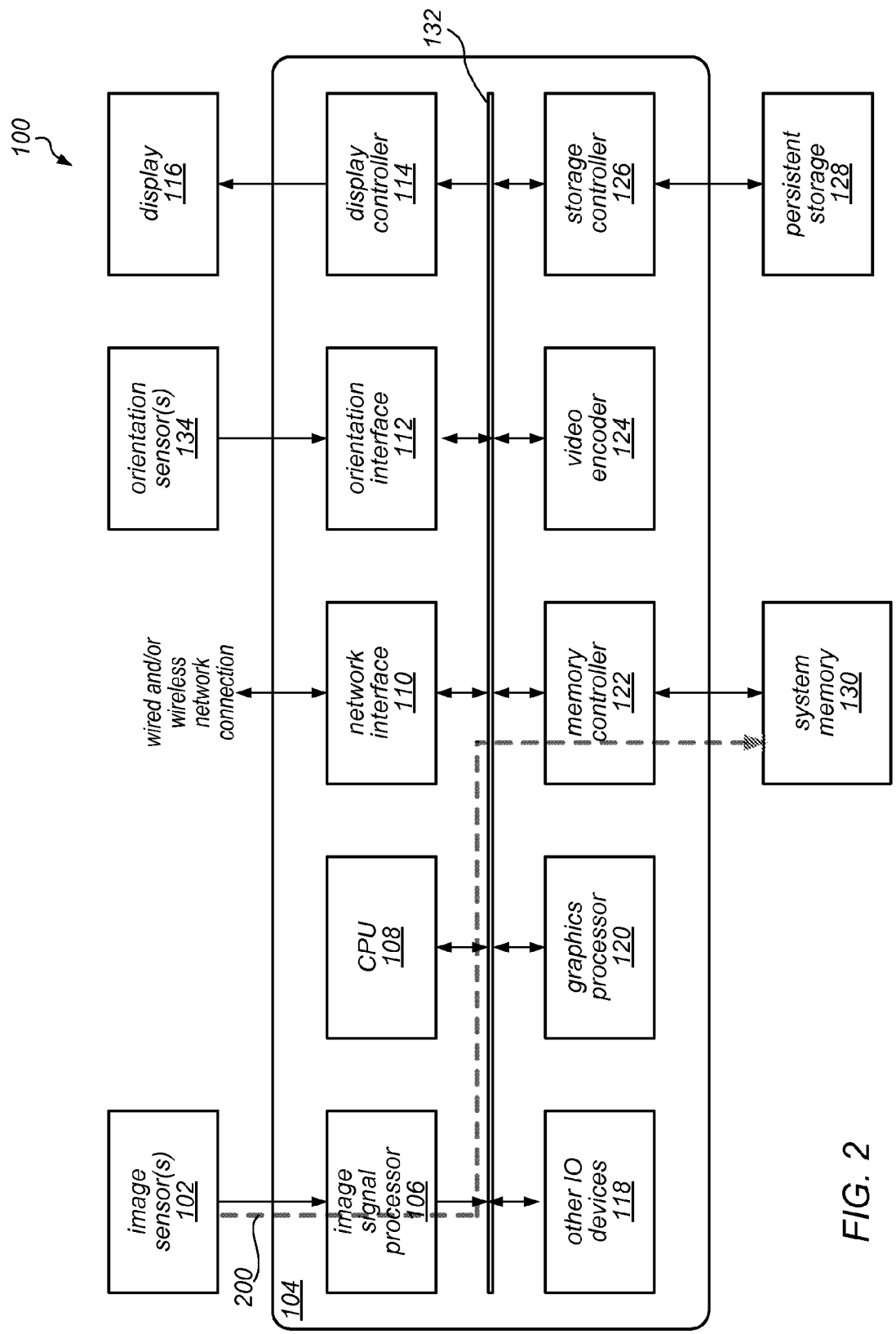
FIG. 2 is a logical block diagram illustrating an example data path in a system that may implement an image processing pipeline that performs temporal filtering using spatial filtering and noise history, according to some embodiments.

FIG. 2 is a block diagram illustrating a data path in a system that implements an image signal processor (specifically, in system 100 illustrated in FIG. 1), according to some embodiments. As illustrated by the dashed lines in this example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

In some embodiments graphics processor 120 may access, manipulate, transform and/or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, and/or display controller 114) without storing the image data to system memory 130.

Figure 3:
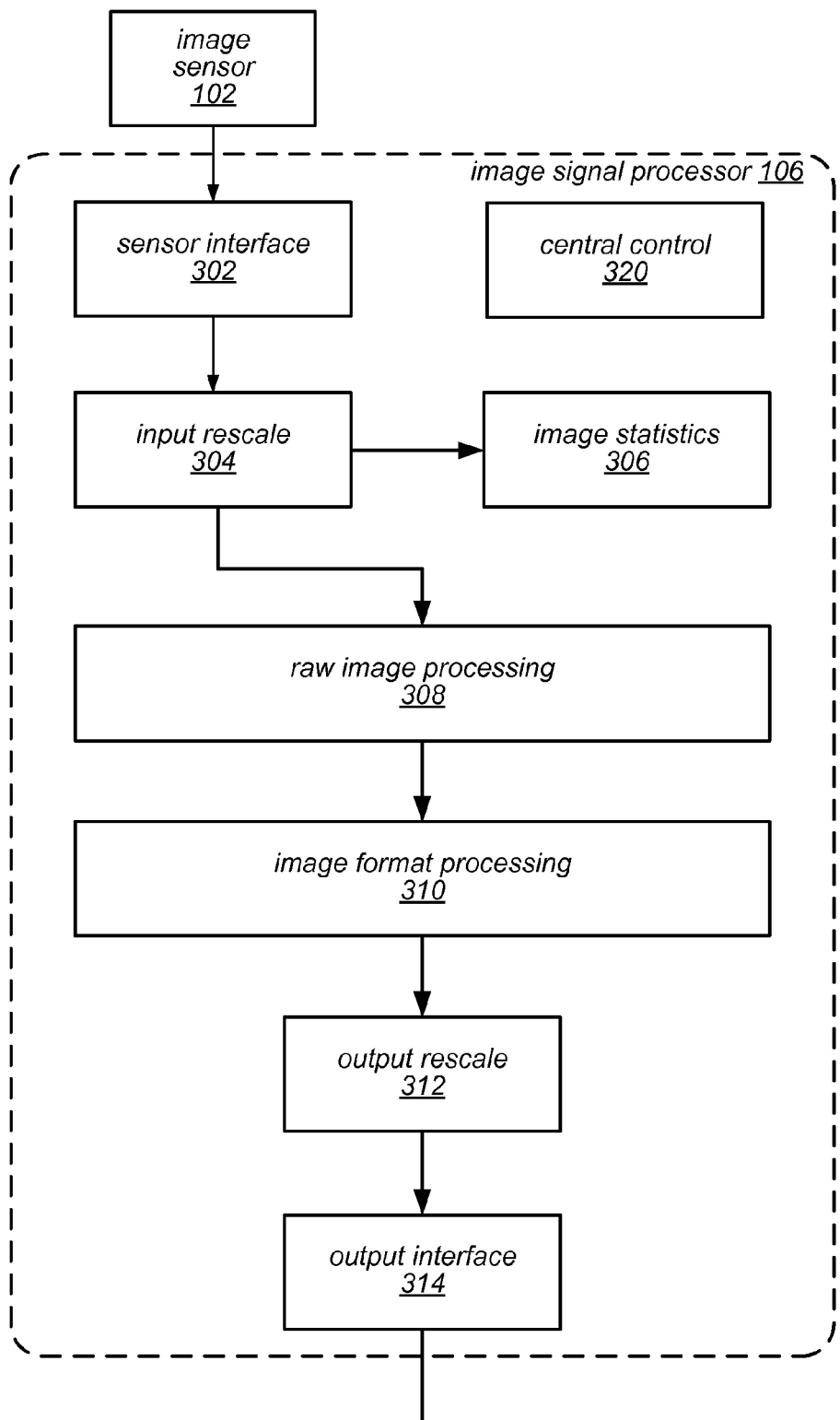
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to an image sensor 102 (from which it receives image data). In this example, ISP 106 implements an image processing pipeline, i.e., a set of stages that process image information from creation (or capture) to output. For example, the various elements illustrated as components of ISP 106 process source data received from image sensor 102 through sensor interface 302 into image data usable by other stages in the pipeline (e.g., input rescale 304, image statistics 306, raw image processing 308, image format processing 310 or output rescale 312), by other components of a system that includes ISP 106 via output interface 314 (including those that access the transformed data from the system memory after it is written to the system memory via memory controller interface 122 or are provided the image data via interconnect 132 directly), and/or by other devices coupled to the system that includes ISP 106. Note that in some embodiments, the image signal processor 106 is a streaming device. In other words, pixels may be received by the image signal processor 106 from the image sensor 102 in raster order (i.e., horizontally, line by line) and may in general be processed through its various pipeline stages in raster order, until finally being output in raster order.

In various embodiments, image signal processor 106 may implement central control module 320. Central control module 320 may configure and start the processing of image data, in some embodiments. For example, central control module may implement performance monitors for logging clock cycles, memory latency, quality of service, and state information. Central control module 320 may update or manage control parameters for units, modules, stages, and/or other components of ISP 106, and may interface with sensor interface 302 to control the starting and stopping of the of the units, modules, stages, and/or other components. For example, in some embodiments, a unit, module, stage, and/or other component may go into an idle state during which programmable parameters may be updated by central control module 320. The unit, module, stage, and/or other component may then be placed into a run state, to perform one or more operations or tasks.

In various embodiments, central control module 320 may be configured to interact with a control process which may be implemented in software at various different layers or locations in SOC component 104 (e.g., application, operating system/kernel or device driver/interface). Programming instructions may be received from a control process that central control module 320 may be configured to implement. For example, central control module can modify programmable parameters for various different units or components with image signal processor, such as sensor interface 302, input rescale module 304, image statistics module 306, raw image processing unit 308, image format processing unit 310, output rescale 312, output interface 314, and/or any components implement within ISP 106 (e.g., temporal filter 400 illustrated in FIG. 4). If, for example, a programming instruction is received requesting that a frame delay setting for a temporal filter be enabled, then a corresponding parameter for the frame delay setting for the temporal filter may be indicated as enabled.

In the illustrated embodiment, ISP 106 may implement input rescale module 304. Input rescale module 304 may downscale full-resolution sensor images to a different resolution (e.g., video resolution) early in the image processing pipeline, which may reduce the power and bandwidth cost of image processing at later states, units, and/or modules of ISP 106, as well as for providing different image resolutions. In some embodiments, input rescale module 304 may perform various functions of other units or modules in the image processing pipeline. For example, in some embodiments, input rescale module 304 may perform a first-pass demosaic of Bayer image data received from image sensor 102, resampling, and then re-mosaicing the image data for the remainder of the image processing pipeline. Input rescale module 304 may handle pixel defects and filtering around highlight regions, such as performing defective pixel correction and performing a highlight-recovery pass. Input rescale module may also convert the image data between different color models, spaces or formats (e.g., RGB or YCbCr), as well as perform specialized color format techniques to correct/enhance raw image data (e.g., chrominance suppression in YCbCr).

In various embodiments, image signal processor 106 may implement image statistics module 306. Image statistics module 306 may perform various functions and collect information. For example image statistics module may, in some embodiments may perform sensor linearization, defective pixel replacement, black level compensation, lens shading correction, and inverse black level compensation, collecting image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting.

In some embodiments, the image statistics collected at image statistics module 306, as well as other information or statistics, may be written to memory and/or provided to a control process for ISP 106. For instance, motion vectors or other indicators of motion between image frames may be determined at a temporal filter, in some embodiments, and may be provided to a control process for programming subsequent components that may account for the determined motion.

In various embodiments image signal processor 106 may implement raw image processing module 308. Raw image processing module 308 may, in various embodiments implement a variety of modules, units, and/or components to perform various operations, functions, or tasks on raw image data (e.g., Bayer format), in different orders, such as sensor linearization, black level compensation, fixed pattern noise reduction, temporal filtering, defective pixel correction, spatial noise filtering, lens shading correction, white balance gain, highlight recovery, and/or raw scaling. A sensor linearization unit may, in some embodiments, map non-linear image data to linear space. Black level compensation may be performed to provide digital gain, offset and clip independently for each color component (e.g., Gr, R, B, Gb) on the pixels image data (which may occur after sensor linearization). Fixed pattern noise reduction may be performed to remove offset fixed patter noise and gain fixed pattern noise by subtracting a dark frame from an input image and multiplying different gains to pixels, in some embodiments. Temporal filtering may perform noise filtering based on pixel values from previous image frame. Defective pixel correction may determine or identify defective pixels, and may replace defective pixel values. Spatial noise filter may reduce noise in image data by averaging neighbor pixels that are similar in brightness. Lens shading correction may apply a gain per pixel to compensate for a dropoff in intensity roughly proportional to a distance from a lens optical center. White balance gains may provide digital gains for white balance, offset and clip independently for all color component Gr, R, B, Gb. Highlight recovery may estimate pixel values for those pixels that are clipped (or nearly clipped) from other channels. Raw scaling may scale down image data in a raw format (e.g., Bayer format). Please note that various examples and descriptions provided above are not intended to be limiting as to the various techniques, components, or formats of raw image data implemented as part of raw image processing, but are instead merely provided as examples.

As noted above, in at least some embodiments, a temporal filter module, unit, or component may be implemented as part of raw image processing module 308, such as temporal filter module 400 described below with regard to FIG. 4. The temporal filter may perform noise filtering based on pixel values from a reference image frame. In some embodiments, the temporal filter may introduce a frame delay into the image processing pipeline of ISP 106 by providing the reference image frame instead of the current image frame. The frame delay may allow downstream processes, units, stages, or components time to gather more information for better analysis of image data, as well as allow downstream processes to be programmatically tailored to the image data. In various embodiments, the temporal filter may perform filtering based on a generated blending value for each pixel on a current image frame that is based on differences determined between neighboring pixels in the current image frame and a reference image frame. In some embodiments, the temporal filter may adjust blending values for pixels based on noise history maintained for the pixels, luminance, and/or radial factor. In some embodiments, the temporal filter may implement dynamic motion estimation and compensation for image data as it is received on the fly, so that a reference image frame may be shifted to align with a current frame before filtering.

In various embodiments, image signal processor 106 may implement image format processing module 310. Image format processing module 310 may, in various embodiments implement a variety of modules, units, and/or components to perform various operations, functions, or tasks, in different orders, such as demosaicing raw image data to RGB image format, local tone mapping, determining gain/offset/clip, color correction, 3D color lookup, RGB gamma mapping, color space conversion (e.g., to YCbCr), statistics collection, luma sharpening, chroma suppression, dynamic range compression, brightness, contrast and color adjustments, YCbCr gamma mapping, chroma decimation and chroma noise reduction. Demosaicing may interpolate missing color samples in image data. Local tone mapping may apply spatially varying local tone curves to image data. Gain, offset, and clip may be determined for each color component in RGB image data. Color correction may be performed using an RGB color correction matrix. RGB gamma mapping may provide a mapping between RGB values using a lookup table for gamma correction. Color space conversion may convert image data to another color format or space (e.g., RBG to YCbCr). Luma sharpening may sharpen luma values. Chroma suppression may attenuate chroma to gray (i.e. no color). Noise in chrominance channels may be filtered. Please note that various examples and descriptions provided above are not intended to be limiting as to the various techniques or components implemented as part of image format processing, but are instead merely provided as examples.

In various embodiments, image signal processor 106 may implement output rescale module 312. Output rescale module 312 may resample, transform and correct distortion on the fly as the ISP 160 processes image data. Output rescale module 312 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing and/or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 312 may, in various embodiments, apply transforms to image data as it is processed at output rescale module 312. Output rescale module 312 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 312 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 312 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame.

Note also that, in various embodiments, the functionally of units 302-314 may be performed in a different order than the order implied by the order of these functional units in the image processing pipeline illustrated in FIG. 3, or may be performed by different functional units than those illustrated in FIG. 3. Image data may not pass directly from one component to another but may be stored in memory or other storage locations and accessed by different components in order to perform processing. Moreover, the various components, units, processes, or other functionalities described in FIG. 3 (or subsequent FIGS. 4-6) may be implemented in various combinations of hardware and/or software.

As noted above, in various embodiments a temporal filter may be implemented as part of an image processing pipeline in an image signal processor, such as image signal processor 106, described above with regard to FIG. 3. A temporal filter may perform noise filtering based on pixel values from a previously filtered image frame. Pixel values from the previously filtered image frame (which may be referred to herein as the reference image frame), may be combined with pixel values of a current image frame to get a best estimate of the pixel values. For example, the temporal filter may average the pixel values in the current image frame and the corresponding pixels in the reference image frame when the current image frame and the reference image frame are similar. In another example, when the pixels of the current image frame and the corresponding pixels of the reference image frame are significantly different (e.g., due to camera motion or object movement in the scene), filtering strength that blends the reference image frame with the current image frame may be reduced (e.g., to avoid trailing or ghosting artifacts). In at least some embodiments, the temporal filter may be adaptive through programmatic (e.g., software) controls based on brightness and/or radial pixel location. FIG. 4 is a logical block diagram illustrating a temporal filter that may be implemented as part of an image processing pipeline, according to some embodiments.

Temporal filter 400 may be a module or component implemented as part of an image processing pipeline, such as image signal processor 106 illustrated above in FIG. 3. In at least some embodiments, temporal filter 400 may be implemented as part of raw image processing unit 308. In some embodiments, temporal filter module 400 may receive image data (e.g., pixels) that has been processed at one or more proceeding components implemented within raw image processing unit 308. For example, in some embodiments, other filters or correction components, such as sensor linearization, black level compensation, and/or fixed noise pattern modules may process image data and provide that image data to temporal filter module 400.

The image data provided to temporal filter 400 may, in some embodiments, be implemented as raw image data (e.g., the same image data format as provided directly to the image signal processor from an image sensor). There may be many different types of raw image data formats, which may include different sizes or configurations of image information for a pixel value (e.g., different MIPI-CSI data types or different image sensor configurations such as different Bayer filters). Current image frame 404 may be image data (e.g., pixels) of a current image that are received at temporal filter 400 in order to generate a filtered version of the pixels as part of generating a filtered version of the current image frame being processed (e.g., live image data from the image sensor or stored image data in a memory/buffer). For instance, current image frame 404 may illustrate individual Bayer pixels of a current image frame in Bayer format that are received for filtering. Please note, as discussed above, image data at temporal filter 400, as well as other components of image signal processor 106 may be processed on a per pixel basis, such that a stream of individual pixels are received for filtering individually at temporal filter 400.

Reference image frame 402 may be image data (e.g., pixel values) stored as part of a reference image frame that was previously filtered at temporal filter 400. Reference image frame 402 may be received from a buffer or memory maintaining the image data for the reference image frame. Reference image frame 402 may be a same type of image data format as current image frame 404 (e.g., Bayer pixels).

Although not illustrated, in some embodiments, if differences in exposure or changes in lighting occur between reference image frame 402 and current image frame 404, it may be advantageous to adjust the brightness of the image data for the two frames so that the differences in exposure or changes in lighting do not adversely affect various analysis, modifications, or other components of temporal filter 400 with respect to the two frames. A respective normalization component may be implemented to adjust the gain and black level for the reference image frame 402 and/or the current image frame 404 respectively. For example, reference image frame 402 may be 10% brighter than the current image frame 404 (e.g., which can happen when the exposure is changing between the frames due to a function like auto-exposure trying to expose the image sensor optimally). If the brightness is different, motion estimation and compensation component 410 may give an erroneous result since the motion estimation algorithm may assume brightness is constant along the motion trajectory. In another example of adverse effect, if the brightness of reference image frame 402 and current image frame 404 does not match, a higher number of pixels in the current image frame 404 would be considered different enough than the reference image frame causing spatially-based filter generator 420 to generate a filter that effectively "turns down" the filtering strength for the reference image frame 402. These and other adverse effects would reduce the quality of the filtering at temporal filter 400 (e.g., when there is only a global brightness difference between the two frames).

Normalization of brightness may be performed by compensating for the exposure differences that may be derived from the differences in exposure times and sensor gains, in various embodiments. For example, current image frame 404 may be scaled based on a set of gain and offset values. Similarly, reference image frame 402 may be scaled based on a separate set of gain and offset values.

In some embodiments, reference image frame 402 and current image frame 404 may be provided to motion estimation and compensation component 410. Motion estimation and compensation component 410 may estimate motion between the reference image frame 402 and the current image frame 404. The estimated motion may then be used to locally shift the reference image frame 402 such that the shifted frame is better aligned to the current image frame 404. Motion estimation and compensation component 410 may be configured to perform motion compensation dynamically without access to the entirety of both of the reference image frame 404. Thus, warped reference image frame 412 may be provided to spatially-based filter generator 420 and filtered image frame generator 440.

Temporal filter 400 may blend the warped reference image frame 412 and the current image frame 404. The blending (or mixing) ratio may vary from pixel to pixel based on how similar a given pixel in the current image frame 404 is compared to a corresponding pixel in the warped reference image frame 412. Spatially-based filter generator 420 may be configured to determine the difference between a given pixel in the current image frame 404 and the corresponding image pixel in the warped reference image frame 412 based on pixels in the current image frame 404 neighboring the given pixel in the current image frame 404, and the corresponding pixels of those neighboring pixels in the warped reference image frame 412. A filter weight 422 may be generated that can be applied to blend the given pixel of the current image frame 404 with the corresponding pixel of the warped reference image frame 412. For example, if the given pixel in the current image frame 404 is similar to a pixel value in the reference frame, then the corresponding pixel of the warped reference image frame 412 pixel may get the majority of the weight in the filtered version of the given pixel.

The generated filter 422 may, in some embodiments, be provided to historically-based filter adjustment component 430. Historically-based filter adjustment component 430 may modify the filter 422 based on noise history maintained for the corresponding pixel of the warped reference image frame 412. Modified filter 432 may be provided to filtered image frame generator 440, which may blend the corresponding pixel of warped reference image frame 412 with the given pixel of current image frame 404 according to the modified filter 432 to generate a filtered version of the given pixel. For example, modified filter 432 may be represented as a value k, which may be used to determine the proportions of the corresponding pixel of warped reference image frame 412 and the given pixel of current image frame 404 to be blended. If k=0.7, then 70% of the filtered version of the given pixel may be from the corresponding pixel in warped reference image frame 412 and 1-k (0.3 or 30%) of the filtered version of the given pixel may be from the given pixel of the current image frame 404. The filtered version of the given pixel may be sent to the reference frame buffer 444 (e.g., written to system memory) to be maintained as part of a filtered version of the current image frame 404, which may be provided as reference image frame 402 for the next current image frame 404 received at temporal filter 400.

In some embodiments, frame output selection component 450 may be implemented as part of temporal filter 400, which may determine whether to provide filtered image frame 442 or reference image frame 402 (not warped) to a downstream unit or component in the image processing pipeline as output image frame 452 (e.g., a component downstream in raw image processing unit 308, image format processing unit 310, output rescale unit 312, and/or output interface 314. Providing the reference frame image 402 may introduce a frame delay into the image processing pipeline, which may be utilized to programmatically configure a component downstream in the image processing pipeline. Frame output selection component 450 may determine which image frame to provide based on a frame delay selection 406 (which may be programmed by central control module 320) indicating whether a delay setting is enabled or disabled. Note, that in some embodiments, the image frame delay may always be provided (or be provided by default). Thus, in some embodiments, frame output selection may not be implemented as the frame delay may be permanently implemented when processing pixels at temporal filter 400.

Figure 4:
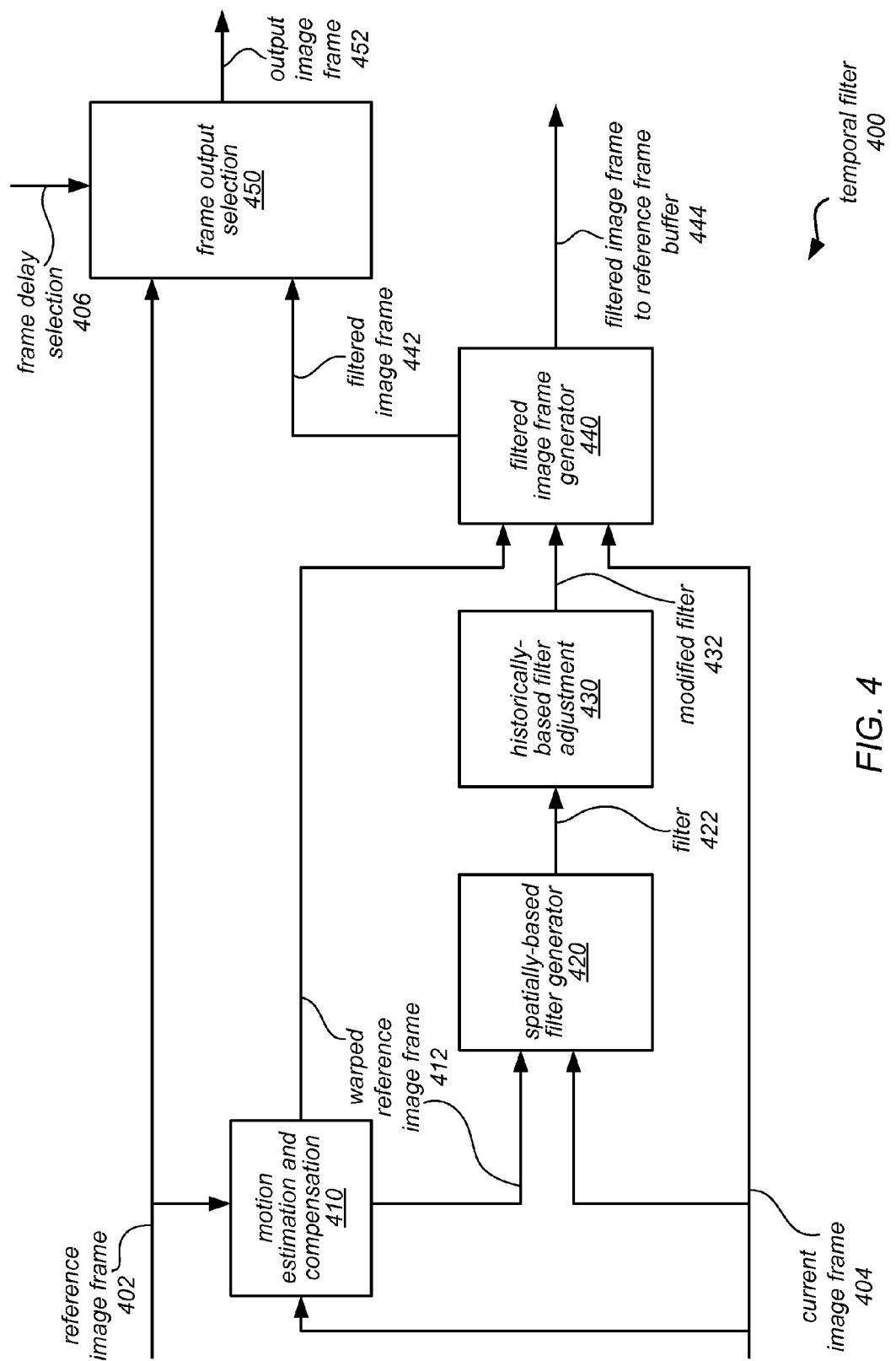
FIG. 4 is a logical block diagram illustrating a temporal filter that may be implemented as part of an image processing pipeline, according to some embodiments.

Please note that FIG. 4 is provided as merely an example of a temporal filter. Different combinations of the illustrated components (as well as components not illustrated) may be used to perform temporal filtering. For example, in some embodiments frame output selection component 450 may not be implemented. Similarly, in some embodiments, motion compensation and estimation component 410 may not be implemented. In some embodiments, spatially-based filter generator 420 may be implemented while historically-based filter adjustment module 430 may not be implemented, or conversely historically-based filter adjustment module 430 may be implemented while a different type of filter generator (e.g., a filter generator that determines pixel difference based on a given pixel and corresponding pixel alone) may be implemented. Thus, the components of FIG. 4 and their respective layout or ordering is not intended to be limiting to the various other combinations which may be used to implement temporal filter 400. Moreover, the temporal filter module as discussed above may be implemented to perform temporal filtering in many different color spaces, and as such may not be limited to Raw or Bayer color formats.

Figure 5:
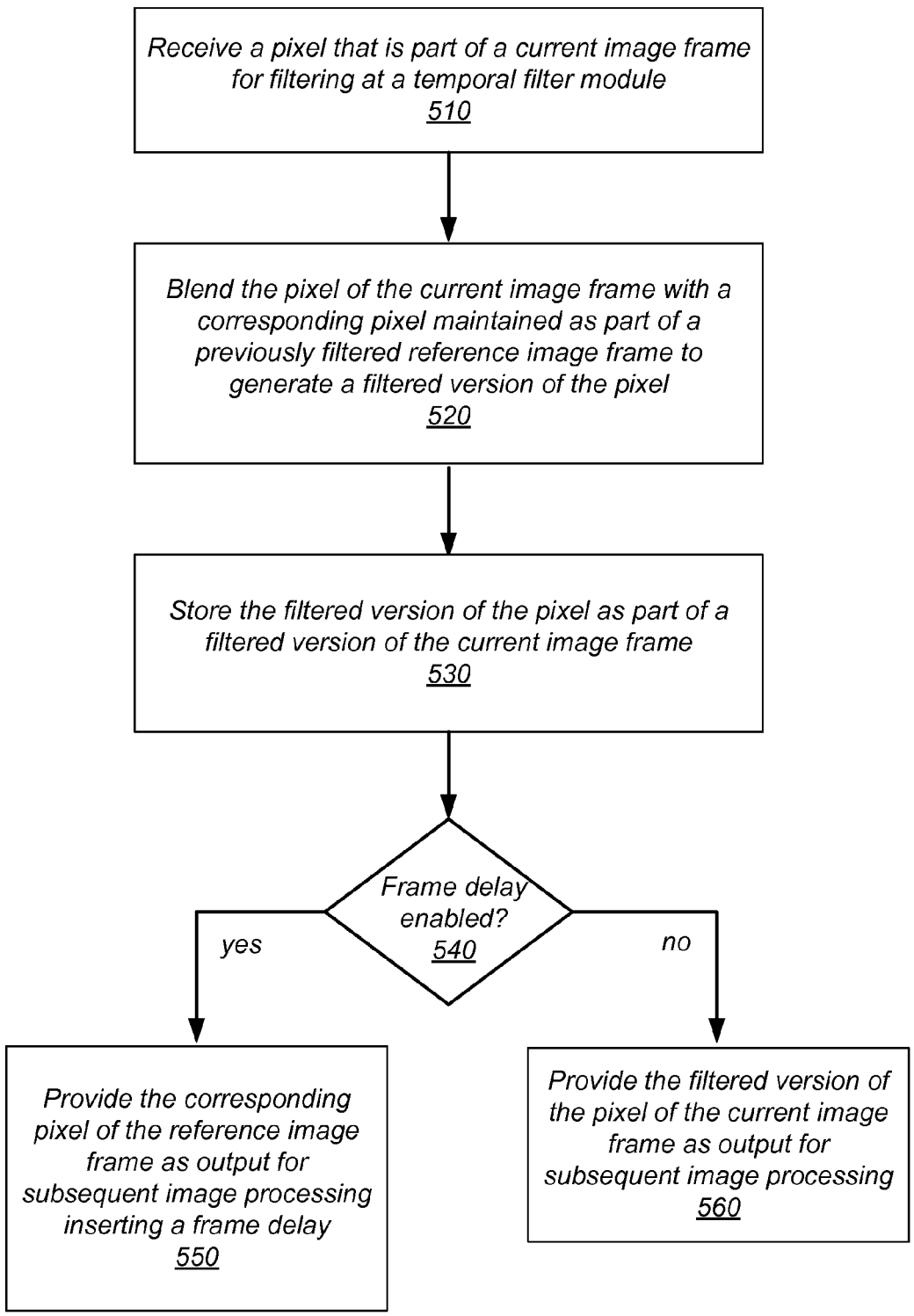
FIG. 5 is a high-level flowchart illustrating various methods and techniques for providing a frame delay using a temporal filter, according to some embodiments.

FIG. 5 is a high-level flowchart illustrating various methods and techniques for providing a frame delay using a temporal filter, according to some embodiments. Various ones of the components in the temporal filter discussed above in FIG. 4 may perform the following techniques, as well as other different embodiments of a temporal filter. A pixel may be received that is part of a current image frame for filtering at a temporal filter module, as indicated at 510. In at least some embodiments the pixel may be in a raw image format (e.g., Bayer format).

As indicated at 520, the pixel of the current image frame may be blended with a corresponding pixel maintained as part of a previously filtered reference image frame in order to generate a filtered version of the pixel. In some embodiments, a filter weight for the blending the pixel with a corresponding pixel in a reference image frame may be determined. For example, the difference between the pixel and the corresponding pixel may be calculated, and based on the difference the filter weight determined (e.g., the more similar the frames, the more of the reference image frame may be blended). In some embodiments, as noted above with regard to spatially-based filter generator 420 in FIG. 4, the filter weight may be determined based, at least in part, on a difference between neighboring pixels of the pixel in the current image frame and corresponding pixels in the reference image frame neighboring the corresponding pixel. One or more spatial filtering techniques, for instance, may be applied to the calculated difference between neighboring pixels of the given pixel in the current image frame and the reference image frame. The filtered difference value of the given pixel may be interpolated to identify a filter weight that corresponds to how well the reference image frame and the current image frame match. The filter weight may indicate, for instance, that the images are similar, and thus more of the reference image frame may be blended into a filtered version of the given pixel than the current image frame.

Once a filter weight is determined, the pixel and the corresponding pixel may be blended according to the filter weight. For example, the filter weight may be represented as a mixing ratio k, where k portion of the reference image frame and 1-k portion of the current image frame are blended together, and where $0 \le k \le 1$. If, for instance, k=0.3, then the pixel value of the corresponding pixel in the reference image frame (e.g., 25) may be multiplied by 0.3, equaling 7.5, and where the pixel value of the current image frame (e.g., 27) may be multiplied by 0.7, equaling 18.9. Thus, the value of the filtered version of the pixel may be 26.4. Please note, that the previous example of blending is not intended to be limiting as various other filter weight representations and blending techniques may be implemented.

In some embodiments, the filtered version of the pixel may be stored as part of a filtered version of the current image frame, as indicated 530. For example, the pixel value may be written to a system memory or other data storage component accessible by a temporal filter. As the filtered version of the pixel may be retrieved from storage when processing a subsequent image frame, the pixel value may be stored in a particular format to aid subsequent processing (e.g., assigning a certain number of bits to pixel value data and assigning a certain number of bits for pixel metadata, such as noise history).

As indicated at 540, in some embodiments it may be determined whether frame delay is enabled for the current image frame. For example, a frame delay setting may indicate whether a frame delay is enabled for the current image. This frame delay setting may be a programmable parameter which a control process or management component (e.g., central control module 320 in FIG. 3) may be configured to update (e.g., in response to requests to enable or disable the frame delay). In some embodiments, frame delay may be automatically or permanently enabled (or enabled by default). If, as indicated by the positive exit from 540, frame delay is enabled, then the corresponding pixel of the reference image frame may be provided as output for subsequent image processing, as indicated at 550. For example, the corresponding pixel may be read in from a memory or buffer when performing temporal filtering. The unaltered corresponding pixel may be directly provided as output (e.g., as illustrated in FIG. 4 when reference image frame 402 is provided directly to frame selection output component 450). Thus, the filtered version of the pixel in the current image frame may be delayed until provided as output when serving as the corresponding pixel of a reference frame for filtering a next image, in various embodiments, inserting a frame delay for the filtered version of the current image. If, as indicated by the negative exit from 540, the frame delay is not enabled, then the filtered version of the pixel of the current image may be provided as output for subsequent image processing, as indicated at 560.

Figure 6:
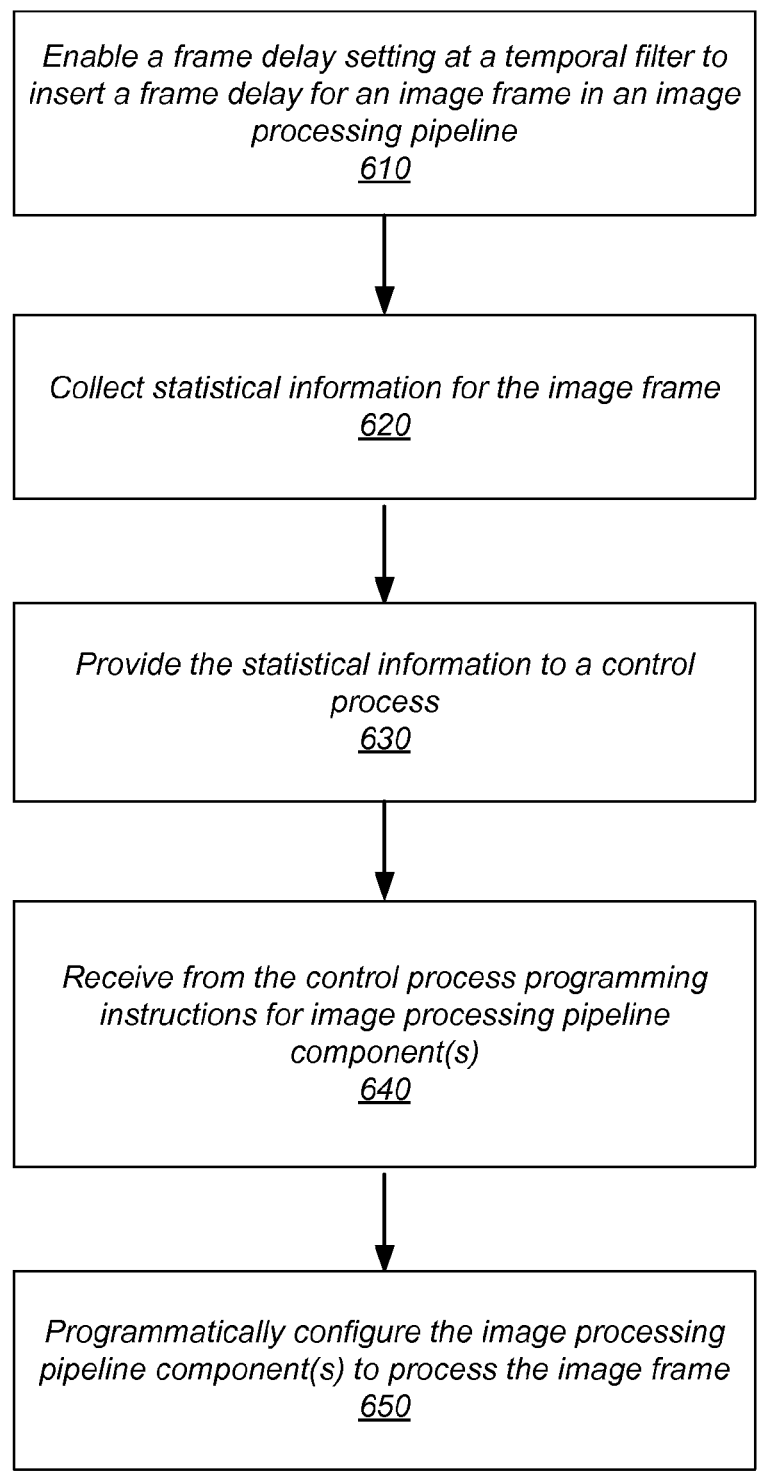
FIG. 6 is a high-level flowchart illustrating various methods and techniques for programming image processing pipeline components during a frame delay introduced by a temporal filter, according to some embodiments.

Inserting a frame delay may introduce latency in the image processing pipeline. For components of the image processing pipeline that perform image processing after/downstream from the temporal filter, the additional time may allow for additional techniques to be performed, additional information to be gathered, or allow for different components to be programmed/configured. FIG. 6 is a high-level flowchart illustrating various methods and techniques for programming image processing pipeline components during a frame delay introduced by a temporal filter, according to some embodiments. Various different ones of the components in the image signal processor discussed above in FIG. 3 may perform the following techniques, as well as other different embodiments of a device implementing an image processing pipeline. Each of the elements below in different combinations may be performed because of or during the frame delay.

As indicated at 610, a frame delay setting may be enabled for a temporal filter to insert a frame delay for an image frame in an image processing pipeline, in various embodiments. Pixels in the reference image frame may be provided as output (as described above in FIG. 5), effectively delaying pixels for a current image frame until the current image frame becomes the reference image frame for a next image frame. Statistical information may be collected, in some embodiments, for the image frame, as indicated at 620. For instance, statistical information collected about an image frame at varying components of the image processing pipeline (e.g., input rescale module 304, image statistics module 306 or raw image format processing 308) may calculated, analyzed, determined and/or otherwise obtained so as to provide information about the image data. In some embodiments, motion data or vectors may be determined at the temporal filter and collected for subsequent image processing components.

In some embodiments, the collected statistical information for the image frame may be provided to a control process, as indicated at 630. For example, the statistical information may be written to a memory or storage device accessible to the control process and from which the control process may be able to retrieve the data. The control process may, in some embodiments, be a software module, application, or other component that may be configured to manage, interact with, access, or otherwise direct at least some portions of the image processing pipeline. For example, a device driver, operating system component, software library, or user application may implement the control process in order to direct the performance of the image processing pipeline.

In some embodiments, programming instructions for image processing pipeline components may be received, as indicated at 640. For example, the programming instructions may provide or indicate values for parameters or settings of particular pipeline components. If, for instance, a lookup table or other set of values are used to provide taps for a filtering component, then the programming instructions may describe or provide the values of the lookup table. The programming instructions may be generated from statistical information provided, as discussed above at element 630. Alternatively, in some embodiments, external sources of information (with respect to the image processing pipeline) may provide information to the control process. For example, in some embodiments an orientation sensor may collect orientation information for a device. The collected orientation information may be provided to a control process which in turn may generate program instructions to configure an image processing pipeline component that may use the orientation information to perform a task or technique, such as image stabilization. As indicated at 650, the image processing pipeline component(s) may be programmatically configured to process the image frame according to the received programming instructions. A central control module (e.g., central control module 320 in FIG. 3) or other component of the image processing pipeline may be configured to receive and apply the programming instructions (e.g., changing register values, providing input parameters, enabling and disabling components, settings, or any other operations in order to adhere to the instructions).

As noted earlier, various ones of elements 620-650 discussed above may occur during (or as a result of) an inserted time frame delay for an image frame. For example, during a frame delay for an image frame in the image processing pipeline, program instructions may be received and the components may be programmed. Similarly, in some embodiments data may be collected and provided to a control process during the time delay. In some embodiments, information collection or other determinations or operations made at external sources of information (e.g., different sensors or processors) may be performed during the frame delay. The control process may also be aware of and direct the enabling of the frame delay to perform various configuration tasks.

Please note that the above examples described with regard to FIG. 6 are not intended to be limiting as to the other operations that may make use of a frame delay inserted into the image processing pipeline at the temporal filter.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
   a memory; and
   an image signal processor comprising a temporal filter module, wherein the image signal processor is configured to:
      generate a filtered version of a given pixel of a plurality of pixels as part of a filtered version of a current image frame received at the temporal filter module for filtering, wherein the generation blends the given pixel of the current image frame with a corresponding pixel of a plurality of pixels that are maintained as part of a previously filtered reference image frame;
      write the filtered version of the given pixel to the memory to be maintained as part of a filtered version of the current image frame;
      determine that a frame delay setting for the temporal filter module is enabled for the current image frame; and
      in response to the determination that the frame delay setting for the temporal filter module is enabled for the current image frame, provide the corresponding pixel of the reference image frame as output for subsequent image processing in order to insert a frame delay for processing the current image frame.

2. The apparatus of claim 1, wherein the temporal filter module is one of a plurality of image processing components implemented in an image processing pipeline, and wherein during the frame delay the image signal processor is further configured to:
   receive from a control process one or more programming instructions for one or more image processing components of the plurality of image processing components that process image data subsequent to the temporal filter module; and
   programmatically configure the one or more image processing pipeline components to process the current image frame.

3. The apparatus of claim 2, wherein during the frame delay the image signal processor is further configured to:
   collect statistical information for the current image frame; and
   provide the statistical information to the control process.

4. The apparatus of claim 1, wherein the image signal processor is further configured to:
   receive a request to disable the frame delay setting;
   generate a filtered version of a given pixel of a plurality of pixels as part of a filtered version of a new current image frame received at the temporal filter module for filtering, wherein the generation blends the given pixel of the new current image frame with a corresponding pixel of a plurality of pixels of another reference image frame to generate a filtered version of the given pixel as part of a filtered version of the new current image frame;
   write the filtered version of the given pixel of the new current image frame to the memory to be maintained as part of the filtered version of the new current image frame;
   determine that a frame delay setting for the temporal filter module is disabled for the new current image frame; and
   in response to the determination that the frame delay setting for the temporal filter module is disabled for the new current image frame, provide the filtered version of the given pixel of the new current image frame as output for subsequent image processing.

5. The apparatus of claim 1, wherein the apparatus comprises a mobile computing device.

6. A method, comprising:
   generating, by an image signal processor, a filtered version of a given pixel of a plurality of pixels of a current image frame received at a temporal filter module for filtering, wherein the generating comprises blending the given pixel with a corresponding pixel of a plurality of pixels that are maintained as part of a previously filtered reference image frame;
   providing, by the image signal processor, the corresponding pixel of the reference image frame as output for subsequent image processing in order to insert a frame delay for processing the current image frame; and
   maintaining, by the image signal processor, the filtered version of the given pixel as part of a filtered version of the current image frame for filtering a subsequent image frame received at the temporal filter module.

7. The method of claim 6, further comprising:
   prior to the generating, receiving, at the image signal processor, a request to enable a frame delay setting;
   determining, by the image signal processor, that a frame delay setting for the temporal filter module is enabled for the current image frame; and
   in response to determining that the frame delay setting for the temporal filter module is enabled for the current image frame, providing the corresponding pixel of the reference image frame as the output.

8. The method of claim 6, wherein the temporal filter module is one of a plurality of image processing components implemented in an image processing pipeline, and wherein the method further comprises:
   during the frame delay:
      receiving, from a control process, one or more programming instructions for one or more image processing components of the plurality of image processing components that process image data subsequent to the temporal filter module; and programmatically configuring the one or more image processing pipeline components to process the current image frame.

9. The method of claim 8, further comprising:
during the frame delay:
collecting statistical information for the current image frame; and
providing the statistical information to the control process.

10. The method of claim 6, wherein maintaining the filtered version of the given pixel, comprises storing the filtered version of the given pixel of the current image frame as part of the filtered version of the current image frame.

11. The method of claim 10, further comprising:
obtaining a corresponding pixel of the stored filtered version of the current image frame; and
performing the generating and the providing for a given pixel of a next image frame received at the temporal filter module for filtering, wherein the filtered version of the current image frame is used as the reference image frame for filtering the next image frame.

12. The method of claim 6, wherein a frame delay setting for the temporal filter is maintained, and wherein the method further comprises:
receiving a request to disable the frame delay setting;
in response to receiving the request, disabling the frame delay setting;
generating a filtered version of a given pixel of a plurality of pixels that comprise a new current image frame received at the temporal filter module for filtering, wherein the generating comprises blending the given pixel of the new current image frame with a corresponding pixel of a plurality of pixels of another reference image frame;
determining that the frame delay setting for the temporal filter module is disabled for the new current image frame; and
in response to determining that the frame delay setting for the temporal filter module is disabled for the new current image frame, providing the filtered version of the given pixel of the new current image frame as output for subsequent image processing.

13. The method of claim 6, wherein the image signal processor is implemented as part of a mobile computing device.

14. A system, comprising:
a device configured to perform image processing, the device comprising:
a sensor interface configured to receive image data captured via an image sensor; and
an image processing pipeline comprising a temporal filter module, wherein the image processing pipeline is configured to:
generate a filtered version of a given pixel of a plurality of pixels captured via the image sensor that comprise a current image frame received at the temporal filter module for filtering, wherein the generation blends the given pixel of the current image frame with a corresponding pixel of a plurality of pixels that are maintained as part of a previously filtered reference image frame;
write the filtered version of the given pixel to a memory to be maintained as part of a filtered version of the current image frame; and
provide the corresponding pixel of the reference image frame as output for subsequent image processing in order to insert a frame delay for processing the current image frame.

15. The system of claim 14, wherein the temporal filter module is one of a plurality of image processing components implemented in an image processing pipeline, and wherein during the frame delay the image signal processor is further configured to:
receive, from a control process, one or more programming instructions for one or more image processing components of the plurality of image processing components that process image data subsequent to the temporal filter module; and
programmatically configure the one or more image processing pipeline components to process the current image frame.

16. The system of claim 15, further comprising:
an orientation sensor, configured to collect orientation data;
wherein the one or more programming instructions are based, at least in part, on the orientation data collected at the orientation sensor; and
wherein the one or more image processing components are configured to perform an image stabilization technique on the current image frame.

17. The system of claim 15, wherein during the frame delay the image processing pipeline is further configured to:
collect statistical information for the current image frame; and
provide the statistical information to the control process.

18. The system of claim 15, wherein the image processing pipeline is further configured to provide the filtered version of the given pixel as output for subsequent image processing when a corresponding pixel of a next current image is filtered at the temporal module.

19. The system of claim 14, wherein the image processing pipeline is further configured to:
determine that a frame delay setting for the temporal filter module is enabled for the current image frame;
in response to the determination that the frame delay setting for the temporal filter module is enabled for the current image frame, provide the corresponding pixel of the image frame as the output;
receive a request to disable the frame delay setting;
in response to the receipt of the request, disable the frame delay setting;
generate a filtered version of a given pixel of a new current image frame received at the temporal filter module for filtering, wherein the generation blends the given pixel of the new current image frame with a corresponding pixel of a plurality of pixels of another reference image frame;
write the filtered version of the given pixel of the new current image frame to a memory to be maintained as part of a filtered version of the new current image frame;
determine that a frame delay setting for the temporal filter module is disabled for the new current image frame; and
in response to the determination that the frame delay setting for the temporal filter module is disabled for the new current image frame, provide the filtered version of the given pixel of the new current image frame as output for subsequent image processing.

20. The system of claim 14, wherein the system is a mobile computing device, and wherein the device is an image signal processor.

* * * * *